3,118,882
PREPARATION OF 17α-FLUOROPROGESTERONE
AND INTERMEDIATES THEREIN
Romano Deghenghi, Westmount, Quebec, Canada, assignor to American Home Products Corporation, New York, N.Y., a corporation of Delaware
No Drawing. Filed Feb. 7, 1962, Ser. No. 171,582
Claims priority, application Canada Feb. 16, 1961
7 Claims. (Cl. 260—239.55)

The present invention relates to 17α-fluoroprogesterone, to a method for its preparation, and to the preparation of intermediates useful in its synthesis.

At least one attempt at introducing fluorine into the 17α-position of progesterone has been made, but this attempt remained unsuccessful (E. L. Shapiro et al. J. Am. Chem. Soc., vol 81, p. 6483 (1959)). The introduction of the 17α-fluoro group into 11-oxygenated steroids of the pregnane series has been described by E. B. Hershberg et al. (J. Am. Chem. Soc. vol. 82, p. 3691 (1960)), but the use of anhydrous hydrogen fluoride in that synthesis results in the formation of large amounts of undesirable by-products with concomitantly poor yields of the desired 17α-fluoro-corticoids. Attempts to apply the reaction with anhydrous hydrogen fluoride to compounds of the pregnene series lacking an oxygen function in the 11-position, resulted in obtaining only unreacted starting materials.

The applicant has now found that introduction of fluorine into the 17α-position of progesterone may be effected smoothly in the following manner. 17α-bromo-progesterone is stirred in solution in an inert water-miscible solvent, in the presence of cyanide ions, and of a buffer, for instance potassium acetate at a temperature between 0° C. and the boiling point of the mixture, preferably at room temperature. Under those conditions the 3-keto-Δ⁴-group remains unaffected and only 20-cyano-17β,20-epoxy-4-isopregnen-3-one is obtained in good yields. A suitable solvent may be, for example, a lower alkanol, a lower ether, for instance ethylene glycol monomethyl ether, a lower cyclic ether, for example dioxane, dimethylformamide, or dimethylsulfoxide.

The latter compound suspended in aqueous hydrofluoric acid containing from five to fifty-five percent hydrogen fluoride and stirred at temperatures between 0° C. and 100° C., preferably at room temperature, adds smoothly the elements of hydrogen fluoride to give 20-cyano-17α-fluoro-20-hydroxy-4-pregnen-3-one in excellent yields.

When dissolving the latter cyanohydrin in a polar water-miscible solvent and refluxing one to twenty-four hours it loses readily the elements of hydrogen cyanide and 17α-fluoroprogesterone is obtained in very good yields. In this reaction small amounts of organic bases such as, for example pyridine, collidine, or triethylamine may also be added to effect complete removal of hydrogen cyanide. A suitable polar water-miscible solvent may be, for example, a lower alkanol, a lower ketone, a lower ether such as, for example, methyl Cellosolve, a lower cyclic ether such as, for example, dioxane, dimethylformamide or dimethylsulfoxide, preferably a lower alkanol with a boiling point between 60° C. and 100° C.

Alternatively, the removal of the elements of hydrogen cyanide may be effected by heating 17α-fluoro-4-pregnen-3-one-20-cyanohydrin in an organic base, obtaining 17α-fluoroprogesterone, as above, but in inferior yields. A suitable organic base may be, for example, pyridine or collidine.

17α-fluoroprogesterone is useful as an orally active progestational agent and also as an intermediate in the synthesis of 17α-fluoro-corticoids, recently described by E. B. Hershberg et al. (J. Am. Chem. Soc., 82, 3691 (1960)). Such synthesis may be carried out by oxidizing 17α-fluoroprogesterone microbiologically in position 11, as described for example in the textbook by L. F. Fieser and M. Fieser, "Steroids," Reinhold Publishing Corp., New York, 1959, pages 672–673. 11-oxygenated 17α-fluoro-compound may then be acetoxylated in position 21 by the method described by H. J. Ringold and G. Stork (J. Am. Chem. Soc., 80, 250 (1958)), and the 21-acetoxy group may be removed by conventional means to obtain the desired 17α-fluoro-corticoids.

The reactions of the invention may be exemplified as follows:

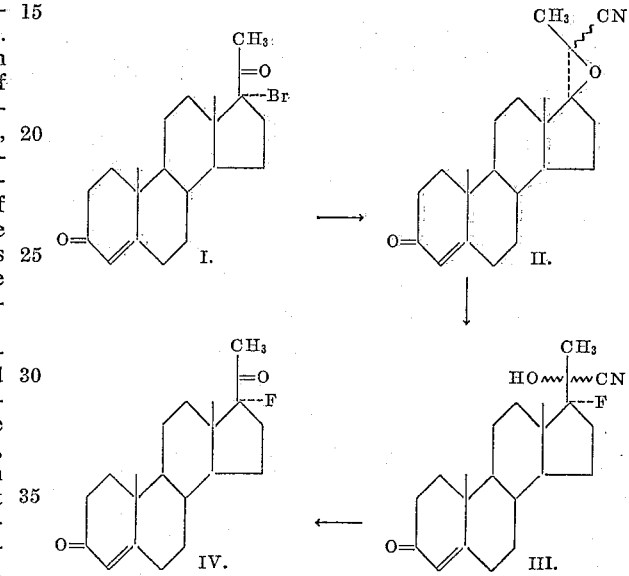

Preferred embodiments of the invention are illustrated further in the following examples.

EXAMPLE 1

*20-Cyano-17β,20-Epoxy-4-Isopregnen-3-One*

To 17α-bromoprogesterone (20 grams) in 1,200 ml. commercial ethanol, was added a mixture of 5.8 grams KCN and 8.5 grams of $CH_3COOK$ in 150 ml. of water.

The resulting solution was stirred at room temperature for twenty-four hours. At the end of this time 3.0 grams of the title compound crystallized out and was collected on a filter. The alcoholic filtrate was poured in excess volume of ice water and the precipitate collected on a filter and washed with water. The combined dried precipitates weighed 17.0 grams representing crude cyano epoxide, M.P. 230–240° C.

A sample was crystallized three times for analysis, M.P. 246–250° C. (methanol), $[\alpha]_D^{25} +21.3$ (1% in chloroform), λ max. 241 mμ (ε 17,400). γ $CHCl_3$:2250 cm.$^{-1}$ (C≡N), Δ⁴-3-ketone at 1665 and 1620 cm.$^{-1}$.

Analysis confirmed the empiric formula $C_{22}H_{29}NO_2$.
Required: C, 77.84; H, 8.61; N, 4.13%. Found: C, 77.81; H, 8.46; N, 4.06%.

EXAMPLE 2

*17α-Fluoroprogesterone*

20-cyano-17β,20-epoxy-4-isopregnen-3-one, 2.4 grams, was suspended in 30 grams of 48% aqueous HF and stirred at room temperature for one hour. The resulting oily substance was taken up in ether and washed to neutrality with sodium bicarbonate solution and water. Evaporation of the solvent gave 2.45 grams of a white solid, which crystallized from ether, M.P. 210–211° C. dec.

When this substance, representing crude 20-cyano-17α-fluoro-20-hydroxy-4-pregnen-3-one, was dissolved in warm aqueous methanol, HCN gas was evolved and 17α-fluoroprogesterone crystallized out of the mixture in about 80% yield.

Alternatively the cyanohydrin (1 gram) was refluxed for one hour in 5 ml. of collidine. After usual working up 0.98 gram of a yellow oil was obtained which, upon chromatography on silica gel, gave 17α-fluoroprogesterone in about 40% yield. M.P. 176–179° C.

Analysis confirmed the empiric formula $C_{21}H_{29}O_2F$. Required: C, 75.87; H, 8.79; F, 5.71. Found: C, 76.08; H, 8.76; F, 5.90.

$\gamma$ $CHCl_3$ 1715 cm.$^{-1}$ (20 C=O), $\Delta^4$-3 ketone at 1665 and 1620 cm.$^{-1}$ $\lambda$ max. m$\mu$ ($\epsilon$ 18,000).

I claim:

1. The process which comprises reacting 20-cyano-17β,20-epoxy-4-isopregnen-3-one in a heterogeneous phase with aqueous hydrogen fluoride, thereby forming 20-cyano-17α-fluoro-20-hydroxy-4-pregnen-3-one.

2. The process which comprises dissolving 20-cyano-17α-fluoro-20-hydroxy-4-pregnen-3-one in a polar water-miscible solvent, thereby forming 17α-fluoroprogesterone, and recovering said latter compound.

3. The process for the preparation of 20-cyano-17β,20-epoxy-4-isopregnen-3-one which comprises subjecting 17α-bromoprogesterone to the action of cyanide ions and a buffer in inert solvent solution, and recovering the resulting reaction product.

4. The process of the preparation of 17α-fluoroprogesterone which comprises reacting 20-cyano-17β,20-epoxy-4-isopregnen-3-one in a heterogeneous phase with aqueous hydrogen fluoride, thereby to form 20-cyano-17α-fluoro-20-hydroxy-4-pregnen-3-one, recovering the latter and dissolving it in a polar water-miscible solvent, thereby causing the formation of 17α-fluoroprogesterone; and recovering the latter compound.

5. The process for the preparation of 17α-fluoroprogesterone which comprises subjecting 17α-bromoprogesterone to the action of cyanide ions in the presence of a buffer in inert solvent solution to form 20-cyano-17β,20-epoxy-4-isopregnen-3-one; reacting the latter with aqueous hydrogen fluoride, thereby to form 20-cyano-17α-fluoro-20-hydroxy-4-pregnen-3-one; recovering the latter and dissolving it in a polar water-miscible solvent, thereby causing the formation of 17α-fluoroprogesterone; and recovering said latter compound.

6. 20-cyano-17α-fluoro-20-hydroxy-4-pregnen-3-one.

7. 20-cyano-17β,20-epoxy-4-isopregnen-3-one.

References Cited in the file of this patent
UNITED STATES PATENTS

| | | |
|---|---|---|
| 2,813,860 | Lincoln et al. | Nov. 19, 1957 |
| 3,040,066 | Marshall | June 19, 1962 |